(12) United States Patent
Zhang et al.

(10) Patent No.: US 12,011,328 B2
(45) Date of Patent: Jun. 18, 2024

(54) METHOD FOR SCALING A PORCELAIN MATERIAL LAYER OF A RESTORATION AND MACHINING PROCESS

(71) Applicants: Shanghai Jieda Dental Laboratory Co., Ltd., Shanghai (CN); Weikang Zhang, Shanghai (CN)

(72) Inventors: Weikang Zhang, Shanghai (CN); Wenxi Zhang, Shanghai (CN)

(73) Assignees: Shanghai Jieda Dental Laboratory Co., Ltd., Shanghai (CN); Weikang Zhang, Shanghai (CN)

( * ) Notice: Subject to any disclaimer, the term of this patent is extended or adjusted under 35 U.S.C. 154(b) by 406 days.

(21) Appl. No.: 17/353,844

(22) Filed: Jun. 22, 2021

(65) Prior Publication Data

US 2021/0307884 A1    Oct. 7, 2021

Related U.S. Application Data

(63) Continuation of application No. PCT/CN2019/127247, filed on Dec. 21, 2019.

(30) Foreign Application Priority Data

Dec. 22, 2018  (CN) .......................... 201811576011.9

(51) Int. Cl.
*A61C 13/00*    (2006.01)
*A61C 5/77*     (2017.01)
(Continued)

(52) U.S. Cl.
CPC ............ *A61C 13/0004* (2013.01); *A61C 5/77* (2017.02); *A61C 13/0022* (2013.01);
(Continued)

(58) Field of Classification Search
CPC ....... A61C 13/0004; A61C 5/77; A61C 13/09; A61C 13/081; A61C 13/083;
(Continued)

(56) References Cited

U.S. PATENT DOCUMENTS 6,398,554 B1    6/2002  Perot et al.
6,648,645 B1 *  11/2003 MacDougald .... C04B 35/62218
                                                433/223
(Continued)

FOREIGN PATENT DOCUMENTS

CN    1293552     5/2001
CN    1545399     11/2004
(Continued)

OTHER PUBLICATIONS

"International Search Report (Form PCT/ISA/210) of PCT/CN2019/127247", mailed on Mar. 23, 2020, with English translation thereof, pp. 1-4.

*Primary Examiner* — Jerzi H Moreno Hernandez
(74) *Attorney, Agent, or Firm* — Cooper Legal Group, LLC

(57) ABSTRACT

A method for scaling the porcelain material of a restoration and the associated machining process is invented, which comprises: establishing a data model of the restoration (S100); dividing the bonding surface or interface between veneer porcelain to be prepared and a restoration substrate into a finite number of element surfaces (S200); establishing the direction coordinate axis on every element surface as its reference axis for setting up a size and a thickness value of veneer porcelain of each element surface (S300); determining and specifying the size and thickness of the veneer porcelain of every element surface according to the preset size and thickness value, and completing the bonding surface by covering it with the veneer porcelain composed of all the element surfaces as scaled with those sizes and thickness values as referred to (S400); generating the outer contour of the veneer porcelain of a clinic restoration (S500).

7 Claims, 4 Drawing Sheets

(51) Int. Cl.
*A61C 13/08* (2006.01)
*B33Y 10/00* (2015.01)
*B33Y 40/20* (2020.01)
*G06F 30/10* (2020.01)

(52) U.S. Cl.
CPC ............ *A61C 13/081* (2013.01); *B33Y 10/00* (2014.12); *B33Y 40/20* (2020.01); *G06F 30/10* (2020.01)

(58) Field of Classification Search
CPC . A61C 13/0022; A61C 13/0013; B33Y 10/00; B33Y 80/00; G06F 30/10; G06F 30/23; G06T 17/20
See application file for complete search history.

(56) References Cited

U.S. PATENT DOCUMENTS

| | | | | |
|---|---|---|---|---|
| 2003/0222366 | A1* | 12/2003 | Stangel | A61C 5/77 264/16 |
| 2005/0023710 | A1* | 2/2005 | Brodkin | A61K 6/818 264/16 |
| 2005/0261795 | A1* | 11/2005 | Ghosh | C04B 35/638 700/118 |
| 2007/0120850 | A1* | 5/2007 | Xie | G06T 17/20 345/423 |
| 2011/0244429 | A1* | 10/2011 | Waizenegger | A61C 5/77 433/203.1 |
| 2011/0275031 | A1* | 11/2011 | Jana | A61C 13/0835 264/16 |
| 2012/0052186 | A1* | 3/2012 | Junglas | A61C 13/09 118/696 |
| 2019/0259219 | A1* | 8/2019 | Lancelle | G06T 19/20 |

FOREIGN PATENT DOCUMENTS

| | | | | |
|---|---|---|---|---|
| CN | 1822796 | | 8/2006 | |
| CN | 101535032 | | 9/2009 | |
| CN | 102938008 | | 2/2013 | |
| CN | 103656760 | | 3/2014 | |
| CN | 104114125 | | 10/2014 | |
| CN | 107689077 | | 2/2018 | |
| CN | 107689077 A | * | 2/2018 | ............ G06T 17/00 |
| CN | 107689254 | | 2/2018 | |
| CN | 107689254 A | * | 2/2018 | ............ G06T 17/30 |
| CN | 108236509 | | 7/2018 | |
| CN | 109657362 | | 4/2019 | |
| WO | 2008066891 | | 6/2008 | |

* cited by examiner

```
┌─────────────────────────────────────────────┐
│ Design and manufacture the substrate frame of│─A100
│ a restoration according to a clinic case to  │
│ be applied to                                 │
└─────────────────────────────────────────────┘
                      │
┌─────────────────────────────────────────────┐
│ According to the design objectives, set up and│─A200
│ build up a layer of green porcelain on the top│
│ surface of the substrate frame in combination │
│ with the above scaling method of the porcelain│
│ material layer; calculate the stratege and    │
│ parameters for an associated processing or    │
│ machining (for example, implemented via CAM)  │
│ according to the thickness and surface(s)     │
│ computed precedingly on the outer contour of  │
│ the green veneer porcelain to be processed or │
│ machined                                      │
└─────────────────────────────────────────────┘
                      │
┌─────────────────────────────────────────────┐
│ Place the shaped green porcelain layer,      │─A300
│ together with its restoration substrate frame,│
│ into a heating furnace for sintering, and     │
│ when the program is completed, take out the   │
│ restoration and cool it                       │
└─────────────────────────────────────────────┘
```

FIG. 5

METHOD FOR SCALING A PORCELAIN MATERIAL LAYER OF A RESTORATION AND MACHINING PROCESS

CROSS-REFERENCE TO RELATED APPLICATION

The present application is a continuation of international application of PCT application No. PCT/CN2019/127247 filed on Dec. 21, 2019, which claims the priority benefit of China application No. 201811576011.9 filed on Dec. 22, 2018. The entirety of each of the above-mentioned patent applications is hereby incorporated by reference herein and made a part of this specification.

BACKGROUND

Technical Field

This invention application relates to the technical field of porcelain material manufacturing technology, in particular to a scaling method and a processing technology of a porcelain material layer of a restoration body.

Description of Related Art

Restoration with prostheses and stomatology restorative bodies usually consist of a substrate made of some ceramic material including zirconia and a layer of porcelain material (such as decorative or veneer porcelain) attached to the substrate. In oral clinic applications, in order to achieve a good occlusal and aesthetic effect, the shape and structure of dental veneer porcelain must be precisely designed and manipulated, and the procedures necessary for proper scaling must be carried out in consistence with the material properties to obtain the profile of an object or actual case prior to sintering. It is same for the design and processing of veneer porcelain restoration in orthopedics. The automatic processing and forming of a porcelain material layer is a new technology for ceramic restorations in the field of restorative medicine, which can significantly improve the quality, production efficiency and economic benefits of restorations with porcelain, and can greatly reduce the labor and production costs of porcelain layer processing. It will help to promote the realization of complete digital intelligent manufacturing and build up the advanced manufacturing system of Industry 4.0.

In the field of dental restoration, the automatic molding of veneer porcelain can be completed by the forming process with stacking green porcelain on zirconia substrate and the sintering process of formed products. Due to the shrinkage of veneered porcelain after sintering (or the expansion of some particular materials), the scaling effect shall be taken into account for the influence on the shape of green porcelain after consequent sintering, during the CAD design and the CAM strategy.

In the field of dental restoration, for the existing CAM softwares and technologies related to shaping of green porcelain, only uniform shrinkage is considered, and the shrinkage processing strategy adopts the method of an equal offset compensation and the approach to a uniform scale factor based on a single reference center. The disadvantage of those compensation techniques is that because the contour of the porcelain surface is offset with an equal amplitude, the proportion of each part of the veneered porcelain is out of proper adjustment, resulting in the produced occlusal relationship is different from the original design in the CAD stage, so that it does not satisfy the performance for the object or clinic case. If the shaping improvement is made still by manually stacking the green porcelain, on one hand, there is uncertainty about whether it can be really perfected, and on the other hand, the significance of the automatic processing technology for veneer porcelain will be lost. If using the uniform scale factor above, especially for a restoration bridge, the axes of the bridge bodies, the retainers and the connectors and their reference axes will deviate from the corresponding axes of the zirconia frame for the teeth and their references, and the positions and outer contour of the shaped porcelain structure will be inconsistent with those by the CAD design; at the same time, the inconsistent porcelain structure and outer contour will be further distorted due to shrinkage after sintering, so as to deform the occlusal relationship proper for the object or clinic case. Similar problems will be encountered in the molding process of porcelain material of the fields of other restorative medicine and industries. Therefore, the improvement of the calculation and shaping technology for restoration with porcelain is necessary and a pendent problem, which will gain a significant and wide range of application values.

SUMMARY

In view of the problem that in the actual application when a non-distributed symmetric or fitting CAD design is performed and used directly to generate the CAM strategy, and a green porcelain layer on a restoration substrate to be sintered will be distorted after sintering so that the quality of the restoration surface of porcelain will not satisfy the demands in the design time, the purpose of this invention is, for one, to propose a method of scaling for the additive layer on a restorative base with porcelain, which can fully evaluate the scaling characteristics of the porcelain layer from green to after sintering before the sintering process of the layer, so that the outer surface of the porcelain layer after sintering will be more precisely closer to the design shape. Based on the above scaling method, the purpose of this invention, for the other, is also to propose a manipulating process for a porcelain material layer on a restoration base. The specific scheme is as follows.

A method for scaling the porcelain material layer of a restoration comprises:
   S100, establishing the data model to represent a shape, size and position relationship of the prosthesis of an object or clinic case;
   S200, dividing the bonding surface between the veneer porcelain layer and the restoration substrate into a finite number of element surfaces;
   S300, establishing the direction coordinate axis on each element surface, which is used as the reference axis to preset a thickness value of the porcelain layer for the individual element surface;
   S400, determining and specifying, based on the preceding reference axis, the thickness of the veneer porcelain of the individual element surface according to the set thickness value, and all the porcelain elements and the associated surfaces, which are scaled as referred to those set thickness values, cover the bonding surface;
   S500, generating the outer surface of the veneer porcelain of the dental prosthesis based on the scaled porcelain element surfaces.

By using the technical solution given above, divide the bonding surface connecting the restoration and the porcelain layer into a finite number of continuous or discontinuous element surfaces; take each element surface as an independent scaling zone; the scaling size of the veneer porcelain thickness in each scaling zone is set independently according to the factors such as the sintering conditions, the position of the scaling zone on the bonding surface and some other associated; the veneer porcelain contour computed with the above scaling method can be closer to the desired objectives after sintering, fulfilling the occlusal relationship in the actual insertion of a object or clinic case. Such a veneer porcelain layer sintered in the later procedure does not need manual polishing, which can significantly improve the processing and molding efficiency of the restoration with porcelain and reduce the production cost.

Further, in the step S100, the restoration body comprises crowns and a bridge, wherein the crown part can be a single crown or multiple crowns connected consecutively, while the bridge is composed of bridge units, retainers and connectors; or a sort of restorations consist of bone parts of a human body to be repaired.

Further, in the step S100, the data model is a two-dimensional one or a three-dimensional one.

Further, in the step S200, for dividing the bonding surface into a limited number of element surfaces, it includes: uniformly or non-uniformly divide the bonding surface into a finite number of element surfaces in line with each different position on the bonding surface; and perform the setup of a dense division or sparse division of element surfaces in line with each different position on the bonding surface.

With the above technical solution, divide into those element surfaces in various ways or patterns, so that the scaling demands can be better adapted, fitted to the bonding surfacer; and the outer contour of the veneer porcelain in the later procedure can be more precisely consistent to the designed shape when the bonding surface is divided in terms of a certain factors referred to as pertinent.

Further, in the step S200, the shape of an element surface can be a rectangle, a hexagon, a diamond or other self-closed ones.

Further, in the step S300, establish the direction coordinate axis on each element surface, and the direction coordinate axis is set perpendicular to the element surface individually.

With the above technical solution, Set up the direction coordinate axis individually normal to every element surface, and this is helpful to simplify the calculation on the outer contour of the veneer porcelain in a later procedure. The direction coordinate axis as set perpendicular to each element surface for reference is also to match the path or orientation along which the contraction or expansion develops for a waiting-to-be-heated green porcelain layer together with its base frame during and after sintering.

Furthermore, in the step S400, if the preset value of thickness for every element surface is consistent, generate the outer profile of the veneer porcelain for a restoration directly based on all the scaled element surfaces;

In case the preset values of thickness are not consistent, perform the inter-surface fitting among the vicinal areas between every two adjacent element surfaces by utilizing a smooth algorithm, spline interpolation, gradient approach or weighted mean etc., for those uneven connections throughout the element surfaces. In such a way, the smooth curved interface between every two adjacent element surface is produced, and the outline surface of the veneer porcelain for a restoration is shaped up together with the scaling method and the interface smooth algorithm.

With the above technical solution, when the scaling size of every element surface is a same, an overall outer contour of the veneer porcelain layer on a base frame is build up combinedly from all the scaled element surfaces which are connected seamlessly between every two adjacent element surfaces. In case the scaling sizes are not a same, some step-like strips or uneven arrangements arise if not fitted. In this case, perform the smooth treatment by utilizing an interface fitting policy and its algorithm. As a result, the smooth of the interfaces among the element surfaces can be ensured in the later shaping procedure, so that the requirements of the acceptable occlusal relationship and aesthetics of a full-ceramic restoration for some dental demand is satisfied.

Further, in the step S400, the smooth algorithm to generate the fitting between every two adjacent element surfaces comprises: Set up at least one boundary line on the interface between each two adjacent element surfaces with a series of preset weight values, and with such a boundary line as the reference, set up the constraint conditions for smooth fitting of the vicinal area among the associated element surfaces.

With the above technical solution, qualify the generation of an entire smooth surface or fitted interfaces as defined above, so that the smooth degree of the smoothed surface or interfaces is guaranteed for a level to satisfy the demand on the outer surface of the combined porcelain layer. At the same time, such a surface or interfaces are capable of computing mathematically for smoothing and fitting, and the processing or machining strategies and their files can be readily produced.

Based on the method for scaling the veneer porcelain material layer of a restoration described above, this invention also proposes a process or machining technique for the porcelain layer of a restoration, which includes:

A100, design and manufacture the substrate frame of a restoration according to a object or clinic case to be applied to;

A200, according to the design objectives, set up and build up a layer of green porcelain on the top surface of the substrate frame in combination with the above scaling method of the porcelain material layer; calculate the strategy and parameters for a related processing or machining (for example, implemented via CAM) according to the thickness and surface(s) computed precedingly on the outer contour of the green veneer porcelain to be processed or machined.

A300, Place the shaped green porcelain layer, together with its restoration substrate frame, into a heating furnace for sintering, and when the program is completed, take out the restoration and cool it.

With the above technical solution, the green porcelain material layer to be sintered can satisfy the design objectives of the porcelain layer after sintering and cooled down, so that the correct alignment or retro-involution against its antagonist, or the occlusal relationship of the restoration with the antagonist is ensured in the later insertion. The efficiency of processing or machining with this technique scheme can be augmented effectively since the shrinkage behavior and properties of the veneer porcelain and its outer surface during and after sintering are sufficiently evaluated in the setup of the green porcelain on the base frame, and as well because the outer surface of the porcelain after sintering does not need additional manual polishing.

Further, in the step A200, arrange the layer of green porcelain material on the outer surface of the base frame, and this includes: Print the green porcelain material onto the base frame by 3D printing technology; or Pile up green porcelain material onto the base frame, perform a compacting treatment, and then mill it with a milling machine to form the expected porcelain layer to be sintered; or Directly press the green porcelain material onto the base frame by using a mold with the designed contour shape to form the expected porcelain layer to be sintered.

Compared with the existing art of counterparts, this invention has the beneficial effects as follows.

(1) For the CAD/CAM design and processing of ceramic restorations with veneer porcelain, the existing technique is a centralized, single scaling or single offset one. Instead of uniform computation throughout, the bonding surface or interface between a restoration body and the green porcelain to be paved on the body is divided into a finite number of element surfaces that are continuous or discontinuous across the overall interface; the element surfaces are independently defined as the individual zones for scaling; the size and thickness of each scaling zone are set up freely and independently in dependence on the factors such as sintering conditions, the position of the element surface located on the connective interface and some other associated (for example, for a medical purpose); the contour of the veneer porcelain obtained by a calculation with the scaling method discussed precedingly can be made more consistent with the shape and objectives required in the design time, and as a result, the correct alignment or retro-involution against its antagonist, or the occlusal relationship of the restoration with the antagonist is highly satisfied for the insertion of the restoration of an object or clinic case.

(2) With a total solution given above for from the CAD design to the CAM strategy and machining data file and up to the completion of restoration sintering, a fully automated processing to produce a series of restorative prostheses with veneer porcelain, orientated to every digital customization, can be realized, with little, or without any labor manipulation, treatment or handling, and therefore it can greatly increase productivity, save production costs, and reduce personnel input.

BRIEF DESCRIPTION OF THE DRAWINGS

FIG. 5 is a schematic flowchart of a manufacturing process of a dental all-ceramic restoration of the present invention.

Reference signs: 1—retainer; 2—bridge unit; 3—connector; 4—green porcelain material layer; 5—reference axis; 6—scaling area.

DESCRIPTION OF THE EMBODIMENTS

Before describing the embodiments of the present invention in detail, it should be noted that the veneer porcelain layer described in the present invention refers to a layer of porcelain material covering the surface of the restoration. For example, in the field of dentistry, it refers to a veneer porcelain on a substrate.

The present invention will be further described in detail below with reference to examples and drawings, but the embodiments of the present invention are not limited thereto.

Figure 1A:
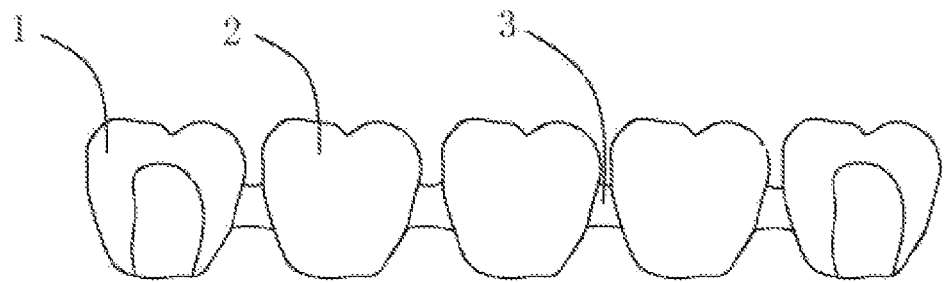
FIG. 1a is a schematic diagram of an outer contour of a zirconia substrate.
Figure 1B:
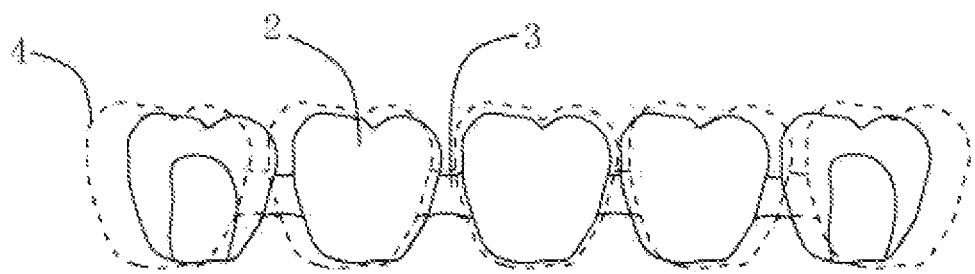
FIG. 1b is a schematic diagram of an outer contour of a veneer porcelain layer in the prior art enlarged uniformly and proportionally.
Figure 2:
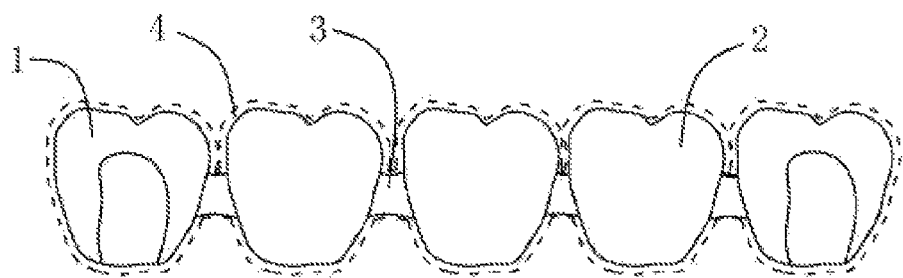
FIG. 2 is a schematic diagram of an outer contour of a veneer porcelain layer after the non-uniform enlargement using a center axis of the substrate as a reference axis.
Figure 3:
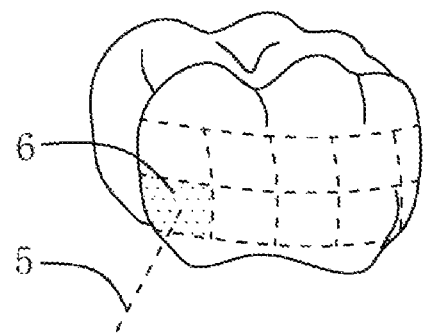
FIG. 3 is a schematic diagram of dividing the surface of the repair unit into multiple scaling areas using the reference axis as a reference.

For convenience of explanation, in this embodiment, a dental all-ceramic restoration is taken as an example for illustration. As shown in FIGS. 1a and 1b, in the prior art, an outer contour of a veneer porcelain that is enlarged uniformly and proportionally or enlarged independently according to the central axis of the substrate (zirconium substrate in dentistry), and there is a misaligning in the positional relationship between it and the substrate (see FIG. 1b, the positions on both sides of the zirconia base). In the production and machining files, such as milling, if the green porcelain material layer 4 is milled according to the above contour, it is very likely to damage the milling cutter or the zirconia substrate, causing unnecessary production losses. At the same time, the green porcelain material layer 4 to be sintered in later phase will shrink after sintering, causing the outer surface of the veneer porcelain on the substrate to be distorted, which is contrary to the design goal and affects quality and use effect of the dental all-ceramic restoration. The above-mentioned problems will also be encountered when setting the porcelain material layer on the surface of other restorations.

Figure 4:
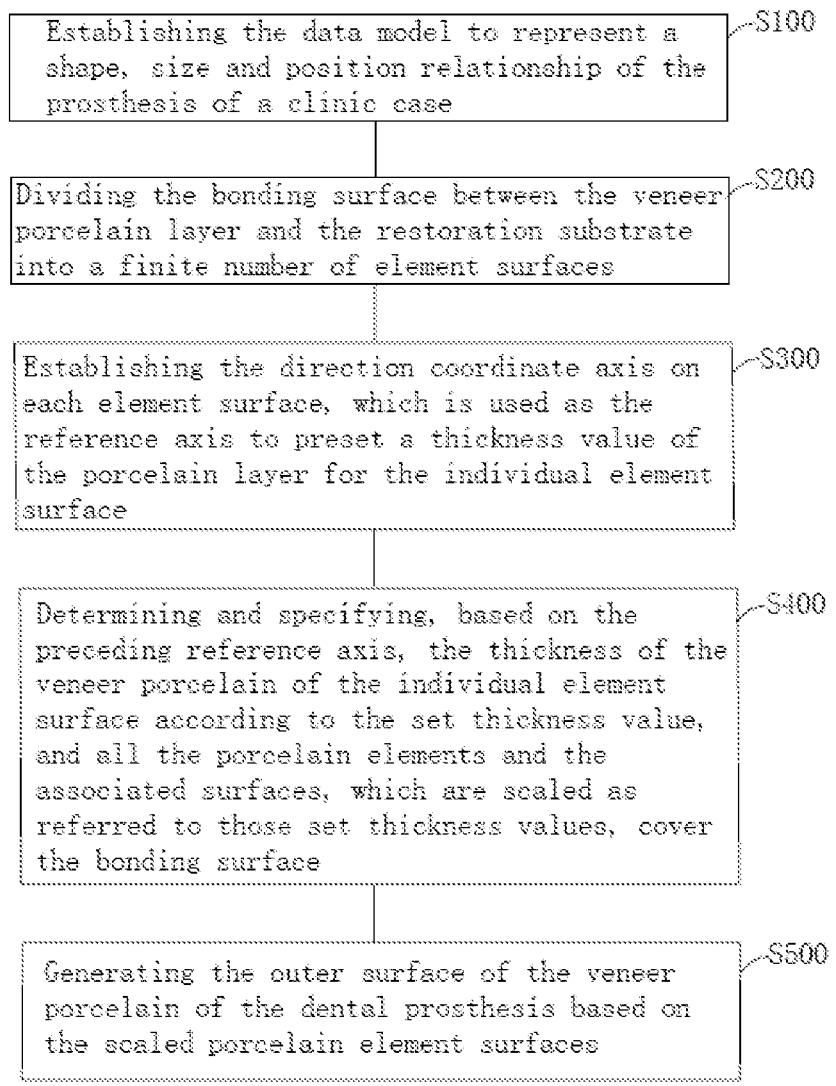
FIG. 4 is a schematic flowchart of a scaling method of the present invention.

In view of the above problems, the present invention proposes a method for scaling a porcelain material layer of a restoration, as shown in FIG. 4, comprises:

S100, establishing a data model for representing a shape, size and position relationship of the restoration;

S200, dividing a bonding surface formed by a veneer porcelain layer and a restoration substrate into a limited number of element surfaces;

S300, establishing a direction coordinate axis on each element surface as a reference axis 5 for setting a thickness value of the veneer porcelain layer of each element surface;

S400, based on the reference axis 5, determining and setting the thickness of the veneer porcelain layer of each element surface according to the set thickness value, and wrapping the bonding surface through the veneer porcelain layer and its outer surface formed by scaling with the set thickness value as a reference;

S500, based on the scaled element surfaces, generating the outer surface of the veneer porcelain layer of the dental restoration.

In the step S100, the restoration comprises a crown and a bridge, wherein the crown comprises a single crown or multiple crowns, and the bridge is composed of bridge unit 2, retainers 1 and connectors 3. In other embodiments, the restoration also comprises bone parts to be repaired by the human body, such as joint bones and head bones. The data model is a two-dimensional lone or a three-dimensional lone, and the above-mentioned data model accurately reflects the shape, size and position relationship of the restoration.

The establishment of the above data model needs to collect the situations of the to-be-repaired dental or bone parts of the application object, and then generate the corresponding data model according to the repair target. The way to collect the situations of the to-be-repaired dental or bone parts of the application object can be realized by three-dimensional scanning. In dentistry, it is possible to make the application object match a sampling block.

In detail, in the step S200, dividing the bonding surface into a limited number of element surfaces comprises: uniformly or non-uniformly dividing the bonding surface into a limited number of the element surfaces in line with each different position on the bonding surface; and performing a setup of a dense division or sparse division of the element surfaces in line with each different position on the bonding surface.

The element surfaces are divided in various forms, which can better meet the scaling requirements of the bonding surface. The above bonding surfaces are divided according to different reference factors, and the veneer porcelain layer outer surface scaled in the later phase can be better in line with the design goal. For example, on the top surface of the dental bridge unit 2, there are relatively many concave and convex surfaces, then the distribution density of the element surfaces is higher, and more accurate scaling is achieved. The side wall of the bridge unit 2 is smoother and may be used as element surfaces to be scaled at this time.

In the step S200, the shape of the element surface comprises a rectangle, a hexagon, a rhombus, or other self-closed shapes. And the above shapes are connected together to cover the bonding surface.

In order to simplify the calculation of the outer surface profile of the veneer porcelain layer in the later phase, in the step S300, the direction coordinate axis is established on each element surface, with the direction coordinate axis being set perpendicular to the element surface. Providing the reference axis 5 along a (normal) direction perpendicular to each element surface also matches the scaling path and orientation of the green porcelain material layer to be sintered and after being heated.

Further, in the step S400, if the set thickness value of the veneer porcelain layer of each element surface remains the same, the outer surface of the veneer porcelain layer of the restoration is directly generated according to the scaled element surfaces; if the set thickness value of the veneer porcelain layer of each element surface is inconsistent, a smooth curved surface generating algorithm is used to perform a curved surface fitting on the adjacent area between every two adjacent element surfaces to generate a smooth curved surface connecting the two adjacent element surfaces, and such scaled element surfaces and smooth curved surfaces are combined to generate the outer surface of the veneer porcelain layer of the restoration.

When the scaling sizes of the element surfaces are the same, after each element surface is scaled, every two adjacent element surfaces will be seamlessly connected to jointly form a veneer porcelain layer and a veneer porcelain layer outer surface on the above-mentioned bonding surface. When the scaling size of each element surface is inconsistent, stepped stripes or uneven warps will be formed on the generated veneer porcelain layer outer surface, and at this time, the smooth curved surface generation algorithm is used to smooth the connection surface of every two adjacent element surfaces, so as to ensure that the entire veneer porcelain layer outer surface generated in the later phase is smooth and meets the requirements of the occlusal relationship and aesthetics of the dental all-ceramic restoration.

In the step S400, a smooth curved surface generation algorithm comprises: at least one boundary line is set on an interface of two adjacent element surfaces of interest with a set weight value(s), and the boundary line is used as a reference to set a constraint condition for smooth fitting of the adjacent region of the boundary.

The above set weight value or values refer to the positional distance between the boundary line or interface line against two adjacent and connected element surfaces. For example, the closer it is, the higher the weight value. The above constraint condition refers to a relationship formed for between the generated smooth curved surface and the boundary line, such as intercrossing, tangent or the smooth curved surface covering the above boundary line, and so on; or, at a position near the connection of the edges of the two adjacent element surfaces, the scaling value is set as the average value of the scaling of two adjacent element surfaces.

The boundary line may be a straight line or a curve. Based on the above technical solution, the generation of a smooth curved surface is defined to ensure that the smoothness of the smooth curved surface satisfies the requirements of the veneer porcelain layer outer surface, and the smooth curved surface can be calculated mathematically, which is convenient for the generation of post-processing files.

Technically the key points of the scaling method of this invention are that: the bonding surface in the restoration in connection with the porcelain material layer is divided into a limited number of continuous or non-continuous element surfaces, and each element surface is used as an independent scaling zone 6; the scaling size and orientation of the thickness of the veneer porcelain layer in each scaling area 6 are independently set according to factors such as sintering conditions, the position of the scaling zone 6 on the bonding surface and so on, and the veneer porcelain layer contour calculated by the above scaling method can be, after sintering, closer to the design goal to meet the aligning or occlusal relationship during usage of the application object. Since the heat radiation received by each area of the restoration is different during the sintering process, the above settings also enable each scaling zone 6 to be better adapted to the above sintering environment, and the sintered veneer porcelain layer in the later phase does not need to be manually polished, which can significantly improve the processing and molding efficiency of the porcelain restoration and reduce the production cost.

Based on the above method for scaling a porcelain material layer of a restoration, the present invention also proposes a machining process for a porcelain material layer of a restoration, comprises:

A100, designing and manufacturing a substrate of a restoration according to the situation of an application object;

A200, according to the design goal, combined with the method for scaling a porcelain material layer of a restoration described above, providing a layer of green porcelain material to be sintered on the outer surface of the substrate, calculating and obtaining a curved surface of the veneer porcelain layer to be processed according to the outer surface of the veneer porcelain layer, and generating a corresponding machining strategy and parameters.

A300, the formed green porcelain material layer to be sintered along with the substrate of the restoration is placed in a heating environment and sintered, and subsequently taken out and cooled.

In the above technical solution, the green porcelain material layer to be sintered can meet the design goal after sintering and cooling, and ensure a normal aligning or occlusal relationship of the restoration in the later phase. Since the shrinkage properties of the veneer porcelain layer outer surface generated after sintering is fully considered in providing the green porcelain material layer to be sintered on the substrate surface, the veneer porcelain layer outer surface generated after sintering does not need to be manually polished, which can effectively improve the processing efficiency.

The step A200 of providing a layer of green porcelain material to be sintered on the outer surface of the substrate is achieved by one or more of the following manners:

using a 3D printing technology to cover the green porcelain material layer to be sintered onto the substrate; or stacking the green porcelain material to be sintered onto the substrate, performing a compaction treatment, and using milling to generate the green porcelain material layer to be sintered; or directly pressing the green porcelain material to be sintered on the surface of the substrate by using a mold with a set shape to form the green porcelain material layer to be sintered; or other specific molding technology processing methods.

The above is only a preferred embodiment of the present invention. The scope of protection of the present invention is not limited to the above-mentioned embodiments, and any technical solution that belongs to the idea of the present invention belongs to the scope of protection of the present invention. It should be noted that for those of ordinary skill in the art, several improvements and retouching without departing from the principles of the present invention should also be regarded as the scope of protection of the present invention.

What is claimed is:

1. A method for scaling a veneer porcelain layer of a restoration, wherein the method comprises:

step S100, establishing a data model to represent a shape, size and position relationship of the restoration;

step S200, dividing a digital representation of a bonding surface formed between the veneer porcelain layer and a restoration substrate into a limited number of element surfaces;

step S300, establishing a direction coordinate axis on each of the element surfaces, which is used as a reference axis for setting a thickness value of the veneer porcelain layer for the element surfaces individually;

wherein the direction coordinate axis is established on each of the element surfaces and set perpendicular to the element surfaces individually, each of the element surfaces is used as an independent scaling zone, a scaling size of the thickness value of the veneer porcelain layer in each of the scaling zones is set independently according to sintering conditions or positions of the scaling zones on the bonding surface;

step S400, determining and specifying, based on the reference axis, a thickness of the veneer porcelain layer based on the element surfaces individually on the bonding surface according to the thickness value, and all of the element surfaces, which are scaled according to the thickness values, cover the bonding surface;

wherein in a case where a preset thickness value for every one of the element surfaces is equal, an outer profile of the veneer porcelain layer for the restoration is directly generated based on all the element surfaces after being scaled, in a case where the preset thickness values are not equal, an inter-surface fitting among vicinal areas between every two adjacent element surfaces of the element surfaces by utilizing a smooth algorithm, spline interpolation, gradient approach or weighted mean, for uneven connections throughout the element surfaces, such that a smooth curved interface between the every two adjacent element surfaces is produced, and an outline surface of the veneer porcelain layer for the restoration is shaped up together with the method for scaling and the smooth algorithm;

wherein the smooth algorithm to generate the inter-surface fitting among the vicinal areas between the every two adjacent element surfaces comprises: setting up at least one boundary line on an interface between the every two adjacent element surfaces with a series of preset weight values, and with such a boundary line as a reference, setting up constraint conditions for smooth inter-surface fitting among the vicinal areas between the every two adjacent element surfaces; and step S500, generating an outer surface of the veneer porcelain layer of the restoration based on the element surfaces after being scaled.

2. The method for scaling according to claim 1, wherein in the step S100, the restoration comprises crowns and a bridge, the bridge is composed of bridge units, retainers and connectors.

3. The method for scaling according to claim 1, wherein in the step S100, the data model is a two-dimensional model or a three-dimensional model.

4. The method for scaling according to claim 1, wherein in the step S200, for dividing the digital representation of the bonding surface into the limited number of element surfaces, the step S200 comprises: uniformly or non-uniformly dividing the digital representation of the bonding surface into the limited number of the element surfaces in line with each different position on the bonding surface; and performing a setup of a dense division or sparse division of the element surfaces in line with each different position on the bonding surface.

5. The method for scaling according to claim 1, wherein in the step S200, a shape of each of the element surfaces is a rectangle, a hexagon, a diamond, or other self-closed shapes.

6. A machining process for the veneer porcelain layer of the restoration, comprising:

step A100, designing and manufacturing a substrate frame of the restoration according to a clinic case for the restoration to be applied to;

step A200, according to design objectives, setting up and building up a layer of green porcelain to be sintered on a top surface of the substrate frame in combination with the method for scaling the veneer porcelain layer of the restoration according to claim 1; and step A300, placing the layer of green porcelain to be sintered after being set up and built up, together with the substrate frame, into a heating furnace for sintering, and at a moment that the placing is completed, taking out the restoration and cooling the restoration.

7. The machining process according to claim 6, wherein the step A200 of setting up and building up the layer of green porcelain to be sintered on the top surface of the substrate frame, comprises:

printing green porcelain material onto the substrate frame by three-dimensional (3D) printing technology; or piling up the green porcelain material onto the substrate frame, performing a compacting treatment, and then milling with a milling machine; or directly pressing the green porcelain material onto the substrate frame by using a mold with a designed contour shape to form an expected porcelain layer to be sintered.

* * * * *